US009330839B2

(12) United States Patent
Omura et al.

(10) Patent No.: US 9,330,839 B2
(45) Date of Patent: May 3, 2016

(54) GRAIN ORIENTED ELECTRICAL STEEL SHEET AND METHOD FOR MANUFACTURING THE SAME

(75) Inventors: Takeshi Omura, Tokyo (JP); Hiroi Yamaguchi, Tokyo (JP); Seiji Okabe, Tokyo (JP)

(73) Assignee: JFE Steel Corporation (JP)

( * ) Notice: Subject to any disclaimer, the term of this patent is extended or adjusted under 35 U.S.C. 154(b) by 248 days.

(21) Appl. No.: 13/814,357

(22) PCT Filed: Aug. 3, 2011

(86) PCT No.: PCT/JP2011/004410

§ 371 (c)(1), (2), (4) Date: Feb. 5, 2013

(87) PCT Pub. No.: WO2012/017655

PCT Pub. Date: Feb. 9, 2012

(65) Prior Publication Data

US 2013/0130043 A1 May 23, 2013

(30) Foreign Application Priority Data

Aug. 6, 2010 (JP) ................................. 2010-177619

(51) Int. Cl.

*B32B 15/00* (2006.01)
*H01F 41/00* (2006.01)

(Continued)

(52) U.S. Cl.

CPC .............. *H01F 41/00* (2013.01); *C21D 8/1255* (2013.01); *C21D 8/1272* (2013.01); *C21D 8/1288* (2013.01); *C22C 38/00* (2013.01); *C22C 38/008* (2013.01); *C22C 38/04* (2013.01); *C22C 38/08* (2013.01); *C22C 38/34* (2013.01); *H01F 1/18* (2013.01); *C21D 2201/05* (2013.01)

(58) Field of Classification Search

None

See application file for complete search history.

(56) References Cited

U.S. PATENT DOCUMENTS

| | | | | |
|---|---|---|---|---|
| 4,293,350 | A | 10/1981 | Ichiyama et al. | |
| 6,565,674 | B1 * | 5/2003 | Kurosaki et al. | 148/308 |
| 2002/0157734 | A1 * | 10/2002 | Senda et al. | 148/111 |

FOREIGN PATENT DOCUMENTS

| | | |
|---|---|---|
| JP | 57-2252 | 1/1982 |
| JP | 63-125620 | 5/1988 |

(Continued)

OTHER PUBLICATIONS

Chinese Official Action dated Jun. 4, 2014 from corresponding Chinese Application No. 201180036001.6, along with an English translation.

(Continued)

*Primary Examiner* — Holly Rickman
*Assistant Examiner* — Linda Chau
(74) *Attorney, Agent, or Firm* — DLA Piper LLP (US)

(57) ABSTRACT

A grain oriented electrical steel sheet is subjected to magnetic domain refining treatment by electron beam irradiation and exhibits excellent low-noise properties when assembled as an actual transformer, in which a ratio (Wa/Wb) of a film thickness (Wa) of the forsierite film on a strain-introduced side of the steel sheet to a film thickness (Wb) of the forsierite film on a non-strain-introduced side of the steel sheet is 0.5 or higher, a magnetic domain discontinuous portion in a surface of the steel sheet on the strain-introduced side has an average width of 150 to 300 μm, and a magnetic domain discontinuous portion in a surface of the steel sheet on the non-strain-introduced side has an average width of 250 to 500 μm.

2 Claims, 1 Drawing Sheet

(51) Int. Cl.

| | |
|---|---|
| ***C21D 8/12*** | (2006.01) |
| ***C22C 38/00*** | (2006.01) |
| ***C22C 38/04*** | (2006.01) |
| ***C22C 38/08*** | (2006.01) |
| ***C22C 38/34*** | (2006.01) |
| ***H01F 1/18*** | (2006.01) |

(56) References Cited

FOREIGN PATENT DOCUMENTS

| | | |
|---|---|---|
| JP | 2-163381 | 6/1990 |
| JP | 4-83825 | 3/1992 |
| JP | 5-51645 | 3/1993 |
| JP | 5-209226 | 8/1993 |
| JP | 5-295446 | 9/1993 |
| JP | 6-136449 | 5/1994 |
| JP | 6-72266 | 9/1994 |
| JP | 11-158556 | 6/1999 |
| JP | 2009-235473 | 10/2009 |

OTHER PUBLICATIONS

Mexican Office Action dated Apr. 20, 2015 of corresponding Mexican Application No. MX/a/2013/000028 along with its English translation.

Japanese Office Action of corresponding Japanese Application No. 2011-172254 dated Feb. 24, 2015 with English translation.

* cited by examiner

GRAIN ORIENTED ELECTRICAL STEEL SHEET AND METHOD FOR MANUFACTURING THE SAME

RELATED APPLICATIONS

This is a §371 of international Application No. PCT/JP2011/004410, with an international filing date of Aug. 3, 2011 (WO 20127017655 A1, published Feb. 9, 2012), which is based on Japanese Patent Application No. 2010-177619 filed Aug. 6, 2010, the subject matter of which is incorporated herein by reference.

TECHNICAL FIELD

This disclosure relates to a grain oriented electrical steel sheet preferably used for iron core materials such as transformers, and a method for manufacturing the same.

BACKGROUND

Grain oriented electrical steel sheets, which are mainly used as iron cores of transformers, are required to have excellent magnetic properties, in particular, less iron loss.

To meet this requirement, it is important that secondary re-crystallized grains are highly aligned in the steel sheet in the (110)[001] orientation (or so-called the Goss orientation) and impurities in the product steel sheet are reduced. Additionally, there are limitations to control crystal orientation and reduce impurities in terms of balancing with manufacturing cost, and so on. Therefore, some techniques have been developed to introduce non-uniformity to the surfaces of a steel sheet in a physical manner and reducing the magnetic domain width for less iron loss, namely, magnetic domain refining techniques.

For example, JP 57-002252 B proposes a technique for reducing iron loss of a steel sheet by irradiating a final product steel sheet with laser, introducing a high dislocation density region to the surface layer of the steel sheet and reducing the magnetic domain width. JP 06-072266 B proposes a technique to control the magnetic domain width by electron beam irradiation.

However, when a grain oriented electrical steel sheet that has been subjected to the above-mentioned magnetic domain refining treatment is assembled into an actual transformer, it may produce significant noise.

It could therefore be helpful to provide a grain oriented electrical steel sheet that may exhibit excellent low noise and low iron loss properties when assembled as an actual transformer, along with an advantageous method for manufacturing the same.

SUMMARY

We thus provide:

[1] A grain oriented electrical steel sheet comprising a forsterite film formed on a surface thereof, being subjected to strain introduction by means of electron beam and having a magnetic flux density $B_8$ of 1.92 T or higher, wherein a ratio (Wa/Wb) of a film thickness of the forsterite film on a strain-introduced side of the steel sheet (Wa) to a film thickness of the forsterite film on a non-strain-introduced side of the steel sheet (Wb) is 0.5 or higher, and wherein a magnetic domain discontinuous portions in a surface of the steel sheet on the strain-introduced side has an average width of 150 to 300 μm, and a magnetic domain discontinuous portion in a surface of the steel sheet on the non-strain-introduced side has an average width of 250 to 500 μm.

[2] A method for manufacturing a grain oriented electrical steel sheet, the method comprising:

subjecting a slab for a grain oriented electrical steel sheet to rolling to be finished to a final sheet thickness;

subjecting the sheet to subsequent decarburization;

then applying an annealing separator composed mainly of MgO to a surface of the sheet before subjecting the sheet to final annealing;

subjecting the sheet to subsequent tension coating; and subjecting, after the final annealing or the tension coating, the sheet to magnetic domain refining treatment by means of electron beam irradiation, wherein (1) the degree of vacuum during the electron beam irradiation is 0.1 to 5 Pa, and (2) a tension to be exerted on the steel sheet during flattening annealing is controlled at 5 to 15 MPa.

[3] The method for manufacturing a grain oriented electrical steel sheet according to item [2] above, wherein the slab for the grain oriented electrical steel sheet is subjected to hot rolling, and optionally, hot rolled sheet annealing, and subsequently subjected to cold rolling once, or twice or more with intermediate annealing performed therebetween, to be finished to a final sheet thickness.

It is possible to provide a grain oriented electrical steel sheet that allows an actual transformer assembled therefrom to effectively maintain the effect of reducing iron loss by magnetic domain refinement using an electron beam. Therefore, the actual transformer may exhibit excellent low noise properties, while maintaining excellent low iron loss properties.

BRIEF DESCRIPTION OF THE DRAWINGS

Our steel sheets will be further described below with reference to the accompanying drawings, wherein.

DETAILED DESCRIPTION

We analyzed the cause of increases in noise when using a grain oriented electrical steel sheet subjected to magnetic domain refinement treatment as an actual transformer. As a result, we found that an increase in transformer noise is caused by a reduction in the thickness of a forsterite film (a film composed mainly of $Mg_2SiO_4$) in the strain-introduced portion when thermal strain is introduced for magnetic domain refinement. In this respect, we also found that noise degradation can be prevented by appropriately adjusting a ratio of a film thickness of the forsterite film on a strain-introduced side of the steel sheet (Wa) to a film thickness of the forsterite film on a non-strain-introduced side of the steel sheet (Wb).

Further, we found that both the average width of a magnetic domain discontinuous portion in a surface of the steel sheet on the strain-introduced side and the average width of a magnetic domain discontinuous portion in a surface of the steel sheet on the non-strain-introduced side have to be adjusted within a proper range. As used herein, the term strain-introduced side indicates the side on which electron beam has been irradiated, and non-strain-introduced side refers to the side on which electron beam has not been irradiated.

Our steel sheets and methods will be specifically described below.

One of the measures to be taken to mitigate an increase in noise when using a grain oriented electrical steel sheet as an actual transformer that has been subjected to strain application and magnetic domain refinement treatment is to satisfy all of the three points given below.

<Control of the Thickness of a Forsterite Film on the Strain-Introduced Side>

The first point is control of the thickness of a forsterite film where strain is introduced. Control of the thickness of a forsterite film is important for the reasons explained below.

A forsterite film on a surface of the steel sheet applies tension to the steel sheet. A variation in the thickness of this forsterite film leads to a non-uniform tension distribution of the steel sheet. The non-uniform tension distribution results in a distortion in the magnetostrictive vibration waveform of the steel sheet which causes an increase in noise. As a result, noise increases with a superimposed harmonic component. Accordingly, to mitigate this increase in noise, it is important to mitigate a reduction in the thickness of the forsterite film at the time of introduction of thermal strain. That is, a ratio (Wa/Wb) of a film thickness of the forsterite film on a strain-introduced side (Wa) to a film thickness of the forsterite film on a non-strain-introduced side (Wb) should be 0.5 or higher, preferably 0.7 or higher.

Besides, the thickness of the forsterite film on each side of the steel sheet before the introduction of strain is usually the same. Thus, the maximum value of Wa/Wb is about 1.

Figure 1:
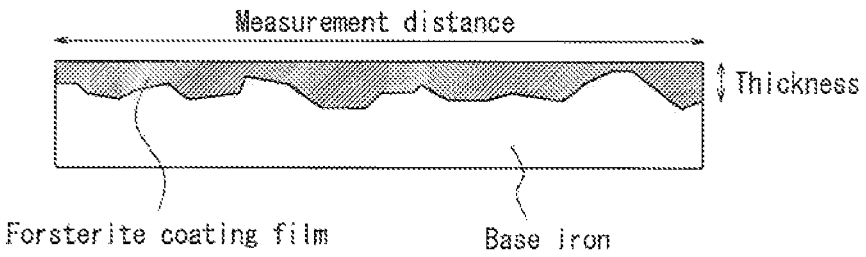
FIG. 1 illustrates a cross-section for measuring the thickness of a forsterite film.

FIG. 1 is a schematic diagram illustrating a cross-section of a steel sheet having a forsterite film. The forsterite film appears to be non-uniform in thickness and has significant irregularities as viewed on a short periodic basis. However, the thickness of the forsterite film may be determined from an average of thickness measurements by using a sufficiently large measurement distance. Specifically, the thickness of the forsterite film may be determined by cutting a sample from a cross-section of the steel sheet, determining an area of the forsterite film over a predetermined measurement distance (preferably 1 mm) (using, preferably, SEM observation and image analysis), and calculating an average of thickness measurements of the film on that surface.

To satisfy the above-described ratio (Wa/Wb), it is important to mitigate a reduction in the thickness of the forsterite film where thermal strain is applied as mentioned above. Means for mitigating this reduction will be described below. Above all, it is important to form a good forsterite film. As used herein, a good forsterite film means a forsterite film that has fewer gaps due to cracking and thus is highly densified. In addition, what is the most influential factor among those causing damage such as cracking to the forsterite film is the tension to be applied to the steel sheet during flattening annealing. If this tension is strong, the forsterite film is damaged and cracking occurs, for example. Thus, in an annealing furnace where the steel sheet has high temperature and thus is more sensitive to tension, it is necessary to control the tension at 15 MPa (1.5 kgf/mm$^2$) or lower.

On the other hand, we control the above-described tension to be 5 MPa (0.5 kgf/mm$^2$) or higher. This is because the tension of less than 5 MPa results in inadequate shape correction of the steel sheet. In addition, it is necessary to control the degree of vacuum during electron beam irradiation. It is generally believed that a higher degree of vacuum is better for electron beam irradiation. However, we found that allowing an adequate amount of oxygen to be left during electron beam irradiation is effective in mitigating reduction of the forsterite film. While the mechanism for this has not been clarified, we believe as follows; oxidation of the steel sheet due to the residual oxygen at the time of introduction of thermal strain might have some influence on maintenance of the film thickness of the forsterite film. To mitigate a reduction in the film thickness of the forsterite film, the degree of vacuum is 0.1 to 5 Pa. If the degree of vacuum is below 0.1 Pa, it is not possible to mitigate the reduction of the forsterite film. Alternatively, if the degree of vacuum is above 5 Pa, it is not possible to apply thermal strain to the steel sheet in an effective manner. The degree of vacuum is more preferably 0.5 to 3 Pa.

<Control of Magnetic Domain Discontinuous Portions in a Surface of the Steel Sheet on the Strain-Introduced Side and in a Surface of the Steel Sheet on the Non-Strain-Introduced Side>

The second point is control of magnetic domain discontinuous portions in a surface of the steel sheet on the strain-introduced side and in a surface of the steel sheet on the non-strain-introduced side, respectively.

While this control of the thickness of the forsterite film may somewhat mitigate an increase in noise, an actual transformer is required to exhibit even lower noise properties and still lower iron loss properties.

In other words, to reduce the iron loss of a transformer, it is also important to reduce the iron loss of the material. That is, to make full use of the magnetic domain refinement effect in the material, the following are important:

(i) To introduce strain until magnetic domain discontinuous portions are also produced in a surface of the steel sheet on the strain-introduced side and in a surface of the steel sheet on the non-strain-introduced side, respectively; and (ii) To minimize the width of each magnetic domain discontinuous portion because strain introduction leads to degradation in hysteresis loss.

The following are specific conditions under which the above items (i) and (ii) are satisfied: an average width of a magnetic domain discontinuous portion in a surface of the steel sheet on the strain-introduced side is 150 to 300 μm; and an average width of a magnetic domain discontinuous portion in a surface of the steel sheet on the non-strain-introduced side is 250 to 500 μm. That is, we satisfy item (i) by defining an average width of a magnetic domain discontinuous portion in a surface of the steel sheet on the non-strain-introduced side, and satisfy item (ii) by setting the upper limit of each average width. Further, the lower limit of each average width is also set because the magnetic domain refinement effect cannot be obtained for a width smaller than the lower limit.

It should be noted that if the maximum tension during flattening annealing and the degree of vacuum during electron beam irradiation are not satisfied as described earlier in relation to the first point, it is extremely difficult to satisfy the above-described heat-affected width without reducing the thickness of the forsterite film.

It should be noted here that what is important is the average widths of magnetic domain discontinuous portions, rather than the average irradiation width. That is, when heat is introduced to the steel sheet, it is diffused in every direction such as the sheet thickness direction or sheet width direction. Accordingly, each magnetic domain discontinuous portion affected by such heat usually tends to be wider than the irradiation width. Additionally, for the same reason, each magnetic domain discontinuous portion on the non-strain-introduced side has a width larger than that of each magnetic domain discontinuous portion on the strain-introduced side.

Figure 2:
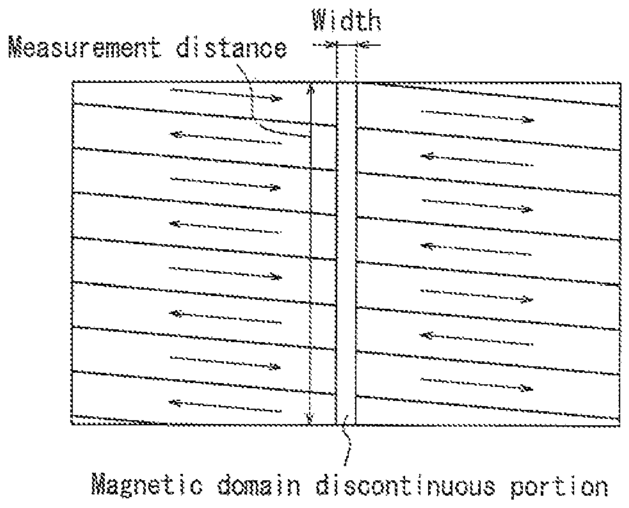
FIG. 2 illustrates the result of observing magnetic domains of the steel sheet.

The width of a magnetic domain discontinuous portion may be obtained by visualizing a magnetic domain structure by the Bitter method using magnetic colloid so that discontinuous portions formed by the electron beam irradiation can be identified (see FIG. 2) and, furthermore, by measuring the widths of magnetic domain discontinuous portions over a predetermined measurement distance (preferably 20 mm) to calculate an average of the width measurements. FIG. 2 is a schematic diagram Illustrating the magnetic domain structure of the grain oriented electrical steel sheet after the magnetic domain refinement treatment, where main magnetic domains are oriented in the horizontal direction and an electron beam is irradiated in the vertical direction at the center of the figure at a substantially right angle to the horizontal direction. A magnetic domain discontinuous portion indicates a region where the structure of main magnetic domain is disrupted by electron beam irradiation, and that substantially corresponds to a region affected by the heat caused by the electron beam irradiation.

<High Degree of Alignment of Crystal Grains of the Material with the Easy Axis of Magnetization>

The third point is the high degree of alignment of crystal grains of the material with the easy axis of magnetization.

Regarding the transformer noise, i.e., magnetostrictive vibration, the oscillation amplitude becomes smaller as the degree of alignment of crystal grains of the material with the easy axis of magnetization becomes higher. Therefore, for noise reduction, a magnetic flux density $B_8$, which gives an indication of the degree of alignment of crystal grains of the material with the easy axis of magnetisation, should be 1.92 T or higher. In this case, if the magnetic flux density $B_8$ is less than 1.92 T, rotational motion of magnetic domains to align parallel to the excitation magnetic field during the magnetization process causes a large magnetostriction. This results in an increase in transformer noise. In addition, the higher the degree of crystal grain alignment, the greater the magnetic domain refinement effect. The magnetic flux density $B_8$ should also be 1.92 T or higher in view of iron loss reduction.

The strain introduction process is limited to a method by electron beam that may reduce damage to the film at a strain-introduced portion. In this case, when electron beam irradiation is performed, electron beam should be irradiated in a direction transverse to the rolling direction, preferably at 60° to 90° to the rolling direction, and the irradiation interval of the electron beam is preferably about 3 to 15 mm. In addition, the electron beam is irradiated in a spot-like or linear fashion under the following conditions: acceleration voltage=10 to 200 kV; current 0.1 to 100 mA; and beam diameter=0.01 to 0.5 mm. A preferred beam diameter is 0.01 to 0.3 mm.

Next, the conditions of manufacturing a grain oriented electrical steel sheet will be specifically described below.

A slab for a grain oriented electrical steel sheet may have any chemical composition that allows for secondary recrystallization.

In addition, if an inhibitor, e.g., an AlN-based inhibitor is used, Al and N may be contained in an appropriate amount, respectively, while if a MnS/MnSe-based inhibitor is used, Mn and Se and/or S may be contained in an appropriate amount, respectively. Of course, these inhibitors may also be used in combination. In this case, preferred contents of Al, N, S and Se are: Al: 0.01 to 0.065 mass %; N: 0.005 to 0.012 mass %; S: 0.005 to 0.03 mass %; and Se: 0.005 to 0.03 mass %, respectively.

Further, our methods are applicable to a grain oriented electrical steel sheet having limited contents of Al, N, S and Se without using an inhibitor.

In this case, the amounts of Al, N, S and Se are preferably: Al: 100 mass ppm or less: N: 50 mass ppm or less; S: 50 mass ppm or less; and Se: 50 mass ppm or less, respectively.

The basic elements and other optionally added elements of the slab for a grain oriented electrical steel sheet will be specifically described below.

<C: 0.08 Mass % or Less>

C is added to improve the texture of a hot-rolled sheet. However, C content exceeding 0.08 mass % increases the burden to reduce C content to 50 mass ppm or less where magnetic aging will not occur during the manufacturing process. Thus, C content is preferably 0.08 mass % or less. Besides, it is not necessary to set up a particular lower limit to C content because secondary recrystallization is enabled by a material without containing C.

<Si: 2.0 to 8.0 Mass %>

Si is an element that is useful to increase electrical resistance of steel and improve iron loss. An Si content of 2.0 mass % or more has a particularly good effect in reducing iron loss. On the other hand, an Si content of 8.0 mass % or less may offer particularly good form ability and magnetic flux density. Thus, the Si content is preferably 2.0 to 8.0 mass %.

<Mn: 0.005 to 1.0 Mass %>

Mn is an element advantageous in improving hot formability. However, Mn content less than 0.005 mass % has a less addition effect. On the other hand, Mn content of 1.0 mass % or less provides a particularly good magnetic flux density to the product sheet. Thus, Mn content is preferably 0.005 to 1.0 mass %.

Further, in addition to the above elements, the slab may also contain the following elements as elements to improve magnetic properties:

at least one element selected from: Ni: 0.03 to 1.50 mass %; Sn: 0.01 to 1.50 mass %; Sb: 0.005 to 1.50 mass Cu: 0.03 to 3.0 mass %; P: 0.03 to 0.50 mass %; Mo: 0.005 to 0.10 mass %; and Cr: 0.03 to 1.50 mass %.

Ni is an element useful to further improve the texture of a hot-rolled sheet to obtain even more improved magnetic properties. However, an Ni content of less than 0.03 mass % is less effective in improving magnetic properties, whereas an Ni content of 1.5 mass % or less increases, in particular, the stability of secondary recrystallization and provides even more improved magnetic properties. Thus, Ni content is preferably 0.03 to 1.5 mass %.

Sn, Sb, Cu, P, Mo and Cr are elements useful to improve the magnetic properties, respectively. However, if any of these elements is contained in an amount less than its lower limit described above, it is less effective to improve the magnetic properties, whereas if present in an amount equal to or less than its upper limit described above, it gives the best growth of secondary recrystallized grains. Thus, each of these elements is preferably present in an amount within the above-described range. The balance other than the above-described elements is Fe and incidental impurities that are incorporated during the manufacturing process.

Then, the slab having the above-described chemical composition is subjected to heating before hot rolling in a conventional manner. However, the slab may also be subjected to hot rolling directly after casting, without being subjected to heating. In the case of a thin slab, it may be subjected to hot foiling or proceed to the subsequent step, omitting hot rolling.

Further, the hot rolled sheet is optionally subjected to hot rolled sheet annealing. A main purpose of the hot rolled sheet annealing is to improve the magnetic properties by dissolving the band texture generated by hot rolling to obtain a primary recrystallization texture of uniformly-sized grains, and thereby further developing a Goss texture during secondary recrystallization annealing. As this moment, to obtain a highly-developed Goss texture in a product sheet, a hot roiled sheet annealing temperature is preferably 800° C. to 1100° C.

If a hot rolled sheet annealing temperature is lower than 800° C., there remains a band texture resulting from hot rolling, which makes it difficult to obtain a primary recrystallization texture of uniformly-sized grains and impedes a desired improvement of secondary recrystallization. On the other hand, if a hot rolled sheet annealing temperature exceeds 1100° C., the grain size after the hot rolled sheet annealing coarsens too much, which makes it difficult to obtain a primary recrystallization texture of uniformly-sized grains.

After the hot rolled sheet annealing, the sheet is preferably subjected to cold rolling once, or twice or more with intermediate annealing performed therebetween, to be finished to a final sheet thickness. The sheet is subjected to subsequent decarburization (combined with recrystallization annealing). Then, an annealing separator is applied to the sheet. After the application of the annealing separator, the sheet is subjected to final annealing for purposes of secondary recrystallization and formation of a forsterite film. It should be noted that the annealing separator is preferably composed mainly of MgO to form forsterite. As used herein, the phrase "composed mainly of MgO" implies that any well-known compound for the annealing separator and any property improvement compound other than MgO may also be contained within a range without interfering with the formation of a forsterite film intended by the invention.

After the final annealing, it is effective to subject the sheet to flattening annealing to correct the shape thereof. Insulation coating is applied to the surfaces of the steel sheet before or after the flattening annealing. As used herein, this insulation coating means such coating that may apply tension to the steel sheet to reduce iron loss (hereinafter, referred to as tension coating). Tension coating includes inorganic coating containing silica and ceramic coating by physical vapor deposition, chemical vapor deposition, and so on.

The grain oriented electrical steel sheet after final annealing or tension coaling as mentioned above is subjected to magnetic domain refining by irradiating the surfaces of the steel sheet with an electron beam. The degree of vacuum during the electron beam irradiation may be controlled as mentioned above to make full use of the thermal strain application effect through the electron beam irradiation, while minimizing damage to the film.

Except the above-mentioned steps and manufacturing conditions, it is possible to apply a conventionally known method for manufacturing a grain oriented electrical steel sheet where magnetic domain refining treatment is performed by an electron beam.

[Experiment 1]

Steel slabs, each having a chemical composition containing the following elements, were manufactured by continuous casting: C: 0.08 mass %; Si: 3.1 mass %; Mb: 0.05 mass %; Ni: 0.01 mass %; Al: 230 mass ppm; N: 90 mass ppm; Se: 180 mass ppm; S: 20 mass ppm; O: 22 mass ppm; and the balance being Fe and incidental impurities. Then, each of these steel slabs was heated to 1400° C., subjected to hot rolling to be finished to a hot-rolled sheet having a sheet thickness of 2.0 mm, and then subjected to hot rolled sheet annealing at 1100° C. for 120 seconds. Subsequently, each steel sheet was subjected to cold rolling to an intermediate sheet thickness of 0.65 mm, and then to intermediate annealing under the following conditions: degree of oxidation $PH_2O/PH_2$=0.32, temperature=1000° C., and duration=60 seconds. Subsequently, each steel sheet was subjected to hydrochloric acid pickling to remove subscales from the surfaces thereof, followed by cold rolling again to be finished to a cold-roiled sheet having a sheet thickness of 0.23 mm.

Then, each steel sheet was subjected to decarb irrigation where it was retained at a degree of oxidation $PH_2O/PH_2$ of 0.50 and a soaking temperature of 830° C. for 60 seconds. Then, an annealing separator composed mainly of MgO was applied to each steel sheet. Thereafter, each steel sheet was subjected to final annealing for the purposes of secondary recrystallization, formation of a forsterite film and purification under the conditions of 1200° C. and 30 hours. Then, an insulation coating composed of 60% colloidal silica and aluminum phosphate was applied to each steel sheet, which in turn was baked at 800° C. This coating application process also serves as flattening annealing.

Thereafter, one side of each steel sheet was subjected to magnetic domain refinement treatment where it was irradiated with electron beam at irradiation width of 0.15 mm and irradiation interval of 5.0 mm in a direction perpendicular to the foiling direction. Then, each steel sheet was evaluated for magnetic properties as a product. The primary recrystallization annealing temperature was varied to obtain materials, each having a value of magnetic flux density $B_8$ of 1.90 to 1.95 T. In addition, an electron beam was irradiated under different conditions with different beam current values and beam scanning rates. Then, each product was subjected to oblique shearing to be assembled into a three-phase transformer at 500 kVA, and then measured for its iron loss and noise in a state where it was excited at 5.0 Hz and 1.7 T. This transformer has design values of iron loss and noise of 55 dB and 0.83 W/kg, respectively. The above-mentioned measurement results on iron loss and noise are shown in Table 1.

TABLE 1

| | Material | | Tension in furnace during flattening | Degree of vacuum during electron beam | | Magnetic domain discontinuous portion on strain- | Magnetic domain discontinuous portion on non-strain- | Transformer | | |
|---|---|---|---|---|---|---|---|---|---|---|
| ID | $W_{17/50}$ (W/kg) | $B_8$ (T) | annealing (MPa) | irradiation (Pa) | Wa/Wb | introduced side (μm) | introduced side (μm) | $W_{17/50}$ (W/kg) | Noise (dBA) | Remarks |
| 1 | 0.67 | 1.93 | 22 | 0.05 | 0 | 290 | 450 | 0.80 | 62 | Comparative Example |
| 2 | 0.67 | 1.93 | 16 | 0.05 | 0.2 | 280 | 440 | 0.80 | 62 | Comparative Example |
| 3 | 0.67 | 1.93 | 15 | 1.0 | 0.3 | 260 | 420 | 0.80 | 61 | Comparative Example |
| 4 | 0.67 | 1.93 | 9 | 2.0 | 0.6 | 250 | 360 | 0.81 | 55 | Example of Present Invention |
| 5 | 0.67 | 1.93 | 9 | 1.5 | 0.8 | 220 | 320 | 0.80 | 54 | Example of Present Invention |
| 6 | 0.73 | 1.93 | 9 | 3.0 | 0.8 | 350 | 270 | 0.88 | 54 | Comparative Example |
| 7 | 0.67 | 1.93 | 11 | 2.5 | 1.0 | 190 | 270 | 0.81 | 54 | Example of Present Invention |
| 8 | 0.76 | 1.93 | 11 | 1.5 | 1.0 | 120 | 200 | 0.91 | 54 | Comparative Example |
| 9 | 0.71 | 1.93 | 11 | 1.5 | 1.0 | 220 | 200 | 0.86 | 54 | Comparative Example |
| 10 | 0.73 | 1.93 | 17 | 0.03 | 0 | 290 | 550 | 0.88 | 62 | Comparative Example |
| 11 | 0.73 | 1.90 | 11 | 1.5 | 0.9 | 200 | 300 | 0.89 | 60 | Comparative Example |

TABLE 1-continued

| | Material | | Tension in furnace during flattening | Degree of vacuum during electron beam | | Magnetic domain discontinuous portion on strain- | Magnetic domain discontinuous portion on non-strain- | Transformer | | |
|---|---|---|---|---|---|---|---|---|---|---|
| ID | $W_{17/50}$ (W/kg) | $B_8$ (T) | annealing (MPa) | irradiation (Pa) | Wa/Wb | introduced side (μm) | introduced side (μm) | $W_{17/50}$ (W/kg) | Noise (dBA) | Remarks |
| 12 | 0.71 | 1.91 | 9 | 2.5 | 0.9 | 200 | 300 | 0.87 | 59 | Comparative Example |
| 13 | 0.69 | 1.92 | 7 | 3.0 | 0.9 | 200 | 300 | 0.82 | 55 | Example of Present Invention |
| 14 | 0.67 | 1.93 | 7 | 1.5 | 0.9 | 200 | 300 | 0.81 | 54 | Example of Present Invention |
| 15 | 0.66 | 1.94 | 11 | 2.5 | 0.9 | 200 | 300 | 0.80 | 53 | Example of Present Invention |
| 16 | 0.65 | 1.95 | 11 | 2.5 | 0.9 | 200 | 300 | 0.79 | 53 | Example of Present Invention |

As shown in Table 1, each grain oriented electrical steel sheet which was subjected to magnetic domain refining treatment by an electron beam and falls within our range, produces low noise when assembled as an actual transformer and inhibits degradation in iron loss properties. The resulting iron loss and low noise properties are consistent with the design value.

In contrast, Comparative Examples of steel sample IDs 11 and 12, which are outside our range in terms of their magnetic flux densities, all tailed to show either low noise properties or low iron loss properties. In addition, Comparative Examples of steel sample IDs 1 to 3 and 10, each of which has a value of (Wa/Wb) less-than 0.5, did not offer low noise properties. Further, Comparative Examples of steel sample IDs 6, 8 and 9, which are outside our range in terms of the average width of a magnetic domain discontinuous portion in a surface of the steel sheet either on the strain-introduced side or non-strain-introduced side, proved to exhibit inferior iron loss properties.

The invention claimed is:

1. A grain oriented electrical steel sheet comprising a forsterite film formed on a surface thereof, being subjected to strain introduction by an electron beam and having a magnetic flux density $B_8$ of 1.92 T or higher, wherein a ratio (Wa/Wb) of a film thickness of the forsterite film on a strain-introduced side of the steel sheet (Wa) to a film thickness of the forsterite film on a non-strain-introduced side of the steel sheet (Wb) is 0.5 or higher, and wherein a magnetic domain discontinuous portion in a surface of the steel sheet on the strain-introduced side has an average width in a direction at right angles to a longitudinal direction of the magnetic domain discontinuous portion of 150 to 300 μm, and a magnetic domain discontinuous portion in a surface of the steel sheet on the non-strain-introduced side has an average width in a direction at right angles to a longitudinal direction of the magnetic domain discontinuous portion of 250 to 500 μm.

2. The grain oriented electrical steel sheet according to claim 1, wherein Wa/Wb is 0.5 to 0.9.

* * * * *